Figures 1, 2:
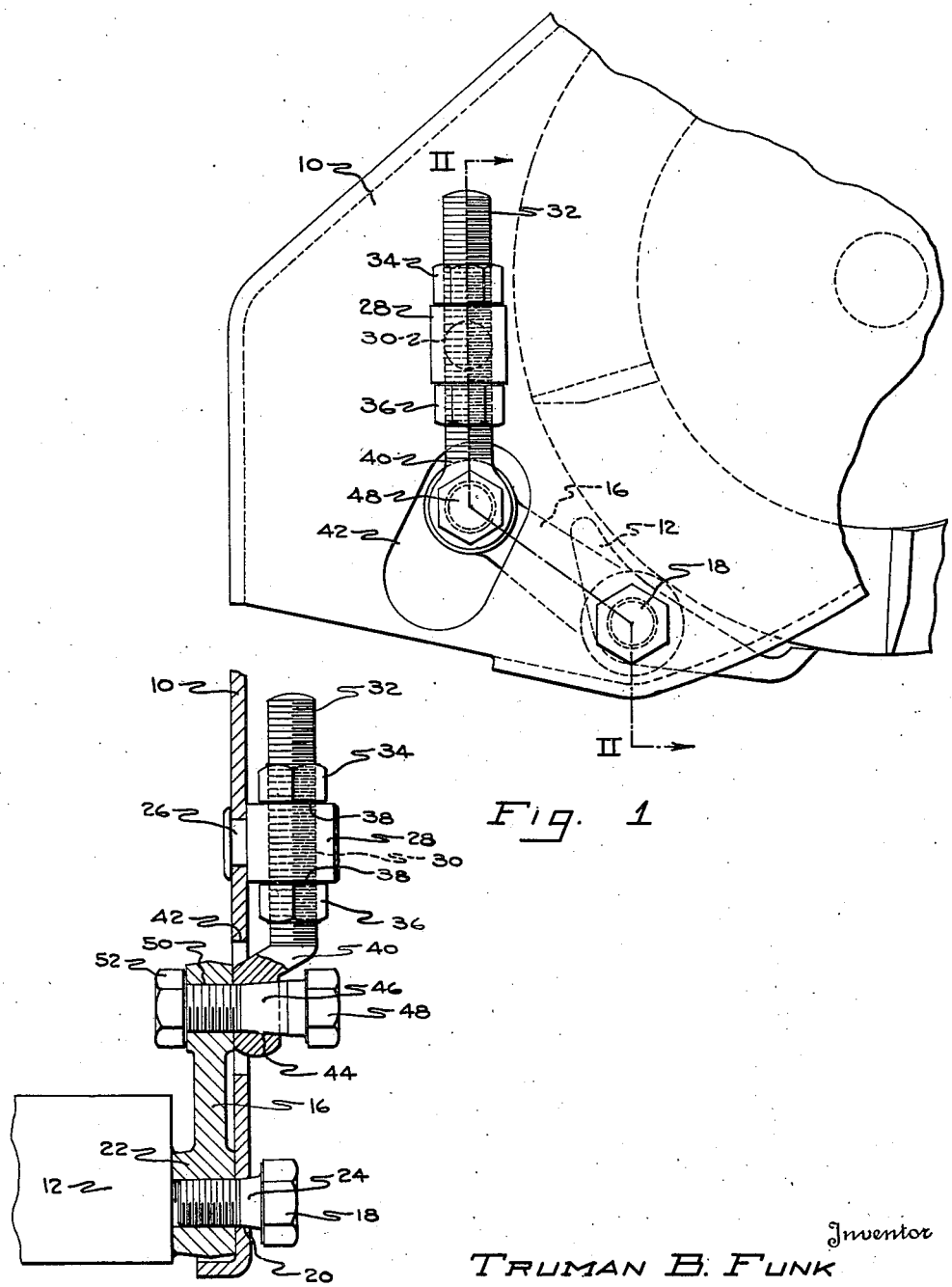

Jan. 20, 1942.     T. B. FUNK     2,270,584
CUTTER BAR ADJUSTMENT ASSEMBLY
Filed July 31, 1940

Inventor
TRUMAN B. FUNK
By Beaman & Langford
Attorneys

Patented Jan. 20, 1942

2,270,584

UNITED STATES PATENT OFFICE 2,270,584

CUTTER BAR ADJUSTMENT ASSEMBLY

Truman B. Funk, Jackson, Mich., assignor to Yard-Man, Inc., Jackson, Mich., a corporation of Michigan Application July 31, 1940, Serial No. 348,965

5 Claims. (Cl. 56—289)

The present invention relates to improvements in cutter adjustment structure for lawn mowers.

In order to silence the operation of lawn mowers, it has become the practice with at least one manufacturer to so accurately machine and rigidly support the component parts of the mower construction that the cutting reel and cutter bar operate out of actual engagement with one another. To obtain and maintain this fine adjustment between these particular parts, it has been advisable to depart from standard forms of cutter bar adjustment structure.

Thus the object of the present invention is to provide an improved adjustment structure for cutter bar which is more accurate and positive in its operation than similar structure heretofore in use.

Another object is to provide an adjustment structure for cutter bars which is manipulated from the outside of the side frame of the lawn mower yet has its line of action substantially in a single plane, thus reducing bending deflection to a minimum.

Other objects of the invention residing in the specific construction, and arrangement and combination of parts will be apparent from the following specification when considered in connection with the accompanying drawing, in which;

Fig. 1 is a fragmentary side elevational view of a lawn mower embodying the present invention, and Fig. 2 is a cross-sectional view taken on line II—II of Fig. 1.

Referring to the drawing, the side frame 10 of the lawn mower supports the cutter bar 12 and adjustment arm 16 for pivotal adjusting movement about the cap screw 18. The screw 18 is passed through a tapered opening 20 in the side frame 10 and is threaded into the lower end 22 of the arm 16 welded to the cutter bar 12. Shank portion 24 of the screw 18 is tapered to effect a rigid wedged engagement between the screw 18 and side frame 10 to obviate any clearance.

An upset shank 26 supports the swivel collar 28 from the outer side of the frame 10. Through the bore 30 operates an eye bolt 32. Adjustment nuts 34 and 36 when tightened down upon the parallel faces 38 cause the bolt 32 to become a rigid part of the frame 10. As shown in Fig. 2, the head 40 of the bolt 32 is offset to project into the plane of the frame 10 through the elongated aperture 42. The aperture 44 of the bolt 38 is tapered as is the shank portion 46 of the cap screw 48 which is threaded at 50 into the upper end of the adjustment arm 16. The nut 52 functions to take up any clearance between the threads of the bolt 48 and the upper end of the arm 16.

It will be noted that the engaging tapers of the bolts 18 and 48 are of substantial extent with the result that from the standpoint of rigidity these bolts function as an integral structure, the engaging tapers providing connections having the rigid characteristics of connections between press fitted parts. The taper engagements in conjunction with the offset of the head 40 reduce possible deflection of the bolt 48 to a minimum.

In practice it is preferred that the adjustment of the cutter bar 12 be effected solely through the manipulation of the nuts 34 and 36 without loosening the screws 18 and 48. In adjustment constructions heretofore provided it has been found that clearance and deflection of parts would permit substantial manipulation of the adjustment nuts without movement of the cutter bar. With the improvement of the present invention this difficulty has been overcome.

Having described my invention, what I desire to protect by Letters Patent and claim is:

1. In a lawn mower, a cutter bar adjustment assembly, a side frame having an aperture therein, a cutter bar, an adjustment arm rigid with said bar, a pivot member for said cutter bar extending through said aperture and threaded into said arm, said member having wedged engagement with said aperture in said side frame, a swiveled collar carried upon the outside of said side frame having a bore therethrough parallel to said side frame, an enlarged aperture in said side frame, an eye bolt having a threaded shank extending through said bore and having the eye thereof in offset relation to said threaded shank, adjustment nuts upon said shank located upon opposite sides of said collar and adapted to be tightened down upon said collar to rigidly position the eye bolt relative to said side frame, the offset eye of said eye bolt being disposed in said enlarged aperture, and a second pivot member extending through the eye of said eye bolt and shaped to wedge therein, said pivot having means to clamp it in said eye and against the upper end of said adjustment arm.

2. In a lawn mower, a cutter bar adjustment assembly, a side frame having an opening therein, a cutter bar supported from said side frame for swiveled movement, a member located upon the inside of said side frame and rigid with said cutter bar, a swivel upon the outside of said side frame, and a member supported in said swivel and pivotally connected through said opening at its inner end to the outer end of said first member, at least one of said members having an offset portion to dispose the same within said opening.

3. In a lawn mower, a cutter bar adjustment assembly, a cutter having an integral adjustment arm, a side frame disposed upon the outside of said bar and arm, a pivot member for said cutter bar having a press fit connection in said side frame, an adjustment bolt upon the outside of said side frame, a swivel in which said bolt is supported, an opening in said side frame, and means for pivotally connecting said adjustment arm and bolt through said opening, said last named pivotal connection being free of play.

4. In a lawn mower having a cutter bar supported for adjustment through pivotal movement from the side frame, an adjustment assembly comprising a pair of members located upon opposite sides of said side frame and having pivotal connection with said side frame at the outer end, at least one of said members having rigidly connected thereto an offset portion extending into the plane of said side frame, and a pivotal connection between said offset portion and the inner end of the other member.

5. A lawn mower cutter bar adjustment assembly comprising a cutter bar having an integral adjustment arm, a side frame disposed upon the outside of said bar and arm, a pivot member for said cutter bar having a press fit connection in said side frame, a swivel supported from said frame, said swivel having a bore therethrough, an adjustment bolt extending through said bore, means associated with said adjustment bolt and swivel for fixing the position of said bolt with respect to said swivel, and means for pivotally connecting said adjustment arm and bolt, said last named pivotal connection being free of play.

TRUMAN B. FUNK.